United States Patent [19]

Murty et al.

[11] Patent Number: 5,621,016
[45] Date of Patent: Apr. 15, 1997

[54] POLYISOCYANATE COMPOSITIONS AND LOW DENSITY FLEXIBLE POLYURETHANE FOAMS PRODUCED THEREWITH

[75] Inventors: Vabilisetti S. Murty, Rochester Hills, Mich.; Gabriel Verhelst, Herent; Mireille B. De Witte, Merelbeke, both of Belgium

[73] Assignee: Imperial Chemical Industries PLC, London, England

[21] Appl. No.: 214,876

[22] Filed: Mar. 16, 1994

Related U.S. Application Data

[63] Continuation-in-part of Ser. No. 46,570, Apr. 12, 1993, abandoned, which is a continuation-in-part of Ser. No. 77,597, Jun. 15, 1993, abandoned.

[30] Foreign Application Priority Data

Apr. 16, 1992 [GB] United Kingdom ............... 9208377
Oct. 12, 1992 [GB] United Kingdom ............... 9221368

[51] Int. Cl.$^6$ ........................................ C08G 18/04
[52] U.S. Cl. ............................. 521/159; 521/170; 528/67; 528/76; 528/85; 525/452; 525/453; 525/458; 525/460; 252/182.22
[58] Field of Search ................ 528/67, 76, 85; 521/159, 170; 525/452, 453, 458, 460; 252/182.22

[56] References Cited

U.S. PATENT DOCUMENTS

| | | | |
|---|---|---|---|
| 3,094,495 | 6/1963 | Gemeinhardt | 260/2.5 |
| 3,939,105 | 2/1976 | Jones, Jr. et al. | 260/2.5 |
| 4,055,548 | 10/1977 | Carleton et al. | 260/77.5 |
| 4,082,703 | 4/1978 | Duffy et al. | 260/2.5 |
| 4,115,429 | 9/1978 | Reiff et al. | 266/453 |
| 4,256,849 | 3/1981 | Ick et al. | 521/129 |
| 4,365,025 | 12/1982 | Murch et al. | 521/159 |
| 4,377,645 | 3/1983 | Guthrie et al. | 521/137 |
| 4,384,050 | 5/1983 | Guthrie | 521/137 |
| 4,478,960 | 10/1984 | Buethe et al. | 521/160 |
| 4,644,018 | 2/1987 | Bowditch et al. | 521/130 |
| 4,668,708 | 5/1987 | Mueller et al. | 521/159 |
| 4,822,517 | 4/1989 | Jasenak | 252/182.21 |
| 4,882,112 | 11/1989 | Maki et al. | 264/109 |
| 4,895,883 | 1/1990 | Pedain et al. | 521/159 |
| 4,910,231 | 3/1990 | Pham et al. | 521/159 |
| 4,916,168 | 4/1990 | Pham et al. | 521/167 |
| 4,942,214 | 7/1990 | Sakhpara | 528/59 |
| 4,945,117 | 7/1990 | Gansen et al. | 521/99 |
| 5,037,879 | 8/1991 | Roberts | 524/590 |
| 5,043,360 | 8/1991 | Pham et al. | 521/159 |
| 5,070,114 | 12/1981 | Watts et al. | 521/159 |
| 5,091,437 | 2/1992 | Lunardon et al. | 521/159 |
| 5,098,937 | 3/1992 | Gallo et al. | 521/167 |
| 5,114,989 | 5/1992 | Elwell et al. | 521/159 |
| 5,122,548 | 6/1992 | Broos et al. | 521/163 |
| 5,177,118 | 1/1993 | Dueber et al. | 521/159 |
| 5,270,348 | 12/1993 | Muller et al. | 521/159 |

FOREIGN PATENT DOCUMENTS

| | | |
|---|---|---|
| 2026033 | 4/1991 | Canada . |
| 0010850 | 5/1980 | European Pat. Off. . |
| 0022617 | 1/1981 | European Pat. Off. . |
| 0257441 | 3/1988 | European Pat. Off. . |
| 0392788 | 10/1990 | European Pat. Off. . |
| 0393903 | 10/1990 | European Pat. Off. . |
| 0398304 | 11/1990 | European Pat. Off. . |
| 0422811 | 4/1991 | European Pat. Off. . |
| 0420273 | 4/1991 | European Pat. Off. . |
| 0442631 | 8/1991 | European Pat. Off. . |
| 0485953 | 5/1992 | European Pat. Off. . |
| 0231214 | 12/1985 | Germany . |
| 0413827 | of 0000 | U.S.S.R. . |
| 1422056 | 1/1976 | United Kingdom . |
| 1479658 | 7/1977 | United Kingdom . |

OTHER PUBLICATIONS

Thoen, J., Elwell, R., Sewell, R., Broos, R., *Replacement of Chlorofluorocarbons in All MDI Automotive Seating Foams*, Polyurethanes World Congress 1991—Sep. 24–26, 1991.

*Primary Examiner*—James J. Seidleck
*Assistant Examiner*—Duc Truong

[57] ABSTRACT

Polyisocyanate compositions are provided which comprise the reaction product of a diphenylmethane diisocyanate composition comprising 25 to 70% by weight of 2,4'-diphenylmethane diisocyanate and an isocyanate-reactive polyoxyethylene polyoxypropylene polyahl having an ethylene oxide content of at least 30% by weight, a number average hydroxyl equivalent weight of 700–2000 and an average nominal hydroxyl functionality of 2–6, the reaction product having a free NCO content of 2–31% by weight.

29 Claims, No Drawings

POLYISOCYANATE COMPOSITIONS AND LOW DENSITY FLEXIBLE POLYURETHANE FOAMS PRODUCED THEREWITH

CROSS-REFERENCE TO RELATED APPLICATIONS

The present application is a continuation-in-part application of U.S. patent application Ser. No. 08/046,570, now abandoned entitled "Polyisocyanate Composition", filed Apr. 12, 1993 and a continuation-in-part of U.S. patent application Ser. No. 08/077,597 entitled "Low Density Flexible Polyurethane Foams, filed Jun. 15, 1993 now abandoned.

FIELD OF THE INVENTION

The present invention is directed to polyisocyanate compositions and reaction systems containing such polyisocyanate compositions for the preparation of flexible polyurethane foams and processes for preparing flexible polyurethanes foams utilizing such reaction systems.

BACKGROUND OF THE INVENTION

The manufacture of flexible polyurethane foams is well known, its chemistry and technology being discussed in reference books such as "Polyurethane Chemistry & Technology", H. Saunders and K. C. Frisch, Robert E. Krieger Publ. Co. (1983); "Polyurethane Handbook", G. Oertel, Hansen Verlag, Munich (1985); and "The ICI Polyurethanes Book", G. Woods, Wiley & Sons (1990). The preparation of flexible foams by reacting a polyisocyanate and a polyol in the presence of a blowing agent has been described in, e.g., U.S. Pat. Nos. 5,114,989; 4,822,517; 4,256,849; and 5,091,437; European Patent Application Publication Nos. 111121; 022617; 010850 and 422471 and United Kingdom Patent No. 1422056; and 1479658. The techniques described within these reference books have been used commercially to produce flexible polyurethane foams for various applications, such as furniture, bedding, automobiles, etc.

Flexible polyurethane foams are generally produced by reacting polyols and polyisocyanates in the presence of water used as a carbon dioxide generator. Halocarbons, such as chlorofluorocarbons ("CFC"'s) have been used as auxiliary blowing agents to supplement the blowing action of the water. Toluene diisocyanate (TDI) based systems have been found to be useful as the polyisocyanate component. More recently, diphenylmethane diisocyanate (MDI) based systems have also found application in the manufacture of flexible polyurethane foams. The MDI-based systems are advantageous because of their lower volatility in comparison to TDI. However, it has been found difficult to produce flexible foams utilizing MDI having sufficiently low density which is comparable to TDI-based systems.

The manufacture of flexible polyurethane foams from isocyanate-containing prepolymers utilizing a mixture of MDI and polymeric forms of MDI is disclosed e.g., in U.S. Pat. No. 4,365,025. This patent discloses flexible polyurethane foams having low compression set values prepared by reacting an aqueous phase with a resin phase containing a prepolymer derived from MDI and a polyol having at least 50% by weight of oxyethylene groups. U.S. Pat. No. 5,114,989 is directed to isocyanate-terminated prepolymers prepared from the reaction of a polyisocyanate comprising 4,4'-diphenylmethane diisocyanate with a polyoxyalkylene polyol having an oxyethylene content of from 40–68% by weight. The prepolymers of this patent are disclosed as being useful when mixed with an active hydrogen-containing composition in preparing flexible polyurethane foams. U.S. Pat. No. 4,668,708 discloses a process for the preparation of elastic polyurethane flexible foams comprising reacting an organic polyisocyanate prepolymer having an isocyanate content of 6–20% by weight prepared by reacting TDI and/or MDI with a di- to tetra-functional polyether polyol having an oxyethylene terminal group content of at least 10–30% by weight with a mixture of compounds containing reactive hydrogen atoms, a blowing agent, a catalyst and optionally auxiliaries and/or additives. The compounds containing the reactive hydrogen atoms include from 10–25 parts by weight water. U.S. Pat. No. 5,070,114 discloses polymethane prepolymer compositions obtained by reacting a polyol component comprising at least one polyoxyalkylene polyol having an equivalent weight of from 500 to 5000 and an average oxyethylene content of 5 to 30% and (b) a stoichiometric excess of an MDI composition.

The preparation of flexible polyurethane foams is also generally described in U.S. Pat. Nos. 5,122,548; 4,910,231; 4,916,168; 5,043,360 and European Patent Application Publication Nos. 257441 and 393903.

However, none of the references discussed above disclose reaction systems or processes which obtain MDI-based flexible foams having a density which is low enough to be comparable with TDI-based foams. Thus, processes and systems for the production of such low density MDI-based foams are needed.

It is thus an object of the present invention to provide reaction systems comprising MDI and processes utilizing such reaction systems which will provide flexible polyurethane foams having a low density which compares favorably to TDI-based systems. It is a further object of the invention to provide flexible polyurethane foams having significantly improved physical properties, such as a lower compression value and a higher tear strength, in spite of their lower density in comparison to conventional MDI-based foams.

SUMMARY OF THE INVENTION

The objectives set forth above are achieved by the present invention which is directed to a polyisocyanate composition comprising the reaction product of a diphenylmethane diisocyanate comprising 25–70% by weight of 2,4'-diphenylmethane diisocyanate and an isocyanate-reactive polyoxyethylene-polyoxypropylene polyahl having an oxyethylene content of at least 30% by weight, an average nominal hydroxyl functionality of 2–6 and a number average hydroxyl equivalent weight of 700–2000, the reaction product having a free NCO content of 2–31% by weight.

The present invention is also directed to polyisocyanate compositions comprising 90–50% by weight of the above reaction product with 10–50% by weight of a polymethylene-polyphenylene polyisocyanate having an average functionality of at least 2.1 and a free NCO content of 27–33% by weight.

The present invention also encompasses reaction systems useful for the preparation of flexible polyurethane foams comprising (a) the polyisocyanate composition discussed above and (b) a polymer having at least two isocyanate-reactive groups and a number average equivalent weight of 700–3000.

The present invention is further directed to a reaction system useful for the preparation of flexible polyurethane foams comprising:

(1) an isocyanate-terminated prepolymer comprising:

(a) greater than 25 to 45% of a polymethylene-polyphenylene polyisocyanate;
(b) 48 to 62% of an organic diisocyanate composition comprising 20 to 70% by weight of 2,4'-diphenylmethane diisocyanate;
(c) 6 to 13% of an isocyanate-reactive polyoxyethylene-polyoxypropylene polyahl containing about 2 to 4 isocyanate-reactive groups, said polyahl having an equivalent weight of 1000 to 2000, an ethylene oxide content greater than 30% on a weight basis of total oxyethylene residues and comprising at least 85% by weight of a copolyether of ethylene oxide and propylene oxide;

(2) a polyol composition comprising 50 to 100% of a polyoxyethylene-terminated polyoxypropylene polyol having a total oxyethylene content of 10 to 21% and a nominal hydroxy functionality of 2–4; and (3) water in an amount greater than about 4 to about 6% by weight based upon the total weight of the polyol composition.

The present invention is also directed to processes for the preparation of flexible polyurethane foams utilizing such reaction systems and products produced by such reaction systems and processes.

DETAILED DESCRIPTION OF THE INVENTION

The polyisocyanate composition of the present invention comprises the reaction product of a diphenylmethane diisocyanate and an isocyanate-reactive polyoxyethylene-polyoxypropylene polyahl. The diphenylmethane diisocyanate composition comprises about 25 to about 70 and preferably about 25 to about 35% by weight of 2,4'-diphenylmethane diisocyanate. Also, it is preferred that these compositions comprise not more than 5% by weight of the 2,2'-isomer and more preferably not more than 2% by weight thereof. Suitable organic diisocyanates are 2,4-toluene diisocyanate, 2,6-toluene diisocyanate, 4,4'-diphenylmethane diisocyanate, 2,4'-diphenylmethane diisocyanate, 2,2'-diphenylmethane diisocyanate and mixtures thereof. Preferred organic diisocyanate are mixtures of 2,4'- and 4,4'-diphenylmethane diisocyanate.

The isocyanate-reactive polyoxyethylene-polyoxypropylene polyahl has an ethylene oxide content of at least 30% by weight. Preferably, the polyahl has an oxyethylene content of about 50 to about 90 and more preferably about 60 to about 90% by weight. It is preferred that this component be a polyoxyethylene polypropylene polyol. The isocyanate-reactive polyahl also has a number average nominal hydroxyl equivalent weight of about 700 to about 2000 and preferably about 1000 to about 1800. The isocyanate-reactive polyoxyethylene-polypropylene polyahls useful in the present invention preferably have the oxyethylene moieties randomly distributed.

The isocyanate-reactive polyoxyethylene-polyoxypropylene polyahls useful in the present invention have an average nominal hydroxyl functionality of about 2 to 6, preferably about 2 to about 4 and more preferably about 3. The term "average nominal hydroxyl functionality" is used herein to indicate the average functionality (number of hydroxyl groups per molecule) of the polyol composition on the assumption that the average functionality of the polyoxyalkylene polyahl is identical with the average functionality (number of active hydrogen atoms per molecule) of the initiator(s) used in its preparation, although in practice it will often be somewhat less because of some terminal unsaturation. Preferably, the level of unsaturation is less than 0.04 mEq/g.

"Polyahl" is a term of the art referring to "poly-active hydrogen compound(s)" which is meant to include all isocyanate-reactive compounds containing a plurality of active hydrogen groups, such as amines, imines, thiols, carboxylic acids, enamino, alcohols, etc. The preferred active hydrogen groups are —OH groups. Particularly important polyahls are polymeric polyols, such as polyesters, polyesteramides, polythioethers, polycarbonates, polyacetate, polyolefins, polysiloxanes and, especially, polyethers.

The isocyanate-reactive polyoxyethylene-polyoxypropylene polyahls useful in the present invention are comprised of at least 85% by weight of a copolyether formed from ethylene oxide and propylene oxide having a molar ratio of oxyethylene to oxypropylene units of from about 1:1 to about 90:10, preferably greater than 40:60. The isocyanate-reactive polyoxyethylene-polyoxypropylene polyahls are random copolymers having an ethylene oxide content of greater than about 30% preferably 50–90, more preferably 68 to 80 and most preferably 70 to 80% on a weight basis of total oxyethylene residues.

The most preferred isocyanate-reactive polyoxy-ethylene-polyoxypropylene polyahls used in the present invention are polyols containing oxyethylene moieties randomly distributed and having a number hydroxyl equivalent weight of 700–3000. These polyols can be obtained in conventional manner by reacting ethylene and propylene oxides simultaneous and/or sequentially in any order with an initiator having 2–6 active hydrogen atoms such as water, ethylene glycol, propylene glycol, butanediol, glycerol, trimethyol propane, ethylene diamine, triethanolamine, sucrose and sorbitol.

The reaction product of the diphenylmethane diisocyanate composition and the isocyanate-reactive polyoxyethylene-polyoxypropylene polyahl which forms the polyisocyanate compositions of the present invention has a free NCO content of about 2 to about 31% by weight, preferably, about 26.5 to about 31% by weight.

Optionally, the polyisocyanate compositions of the present invention may also contain an isocyanate-reactive polyoxypropylene polyahl in an amount of 0 to 15% and preferably about 0.2 to about 10% and most preferably about 0.2 to 4 % by weight. This component generally contains about 2 to 4 isocyanate-reactive groups and has an equivalent weight of about 800 to 2,000 and preferably about 900 to about 1,200. Furthermore, the isocyanate-reactive polyoxypropylene polyahl should comprise at least 90% by weight oxypropylene units. The polyoxypropylene polyahl, if present, should be used in a ratio by weight to the polyoxyethylene-polyoxypropylene polyahl to provide a ratio of oxyethylene to oxypropylene units in the prepolymer of greater than 25:75, more preferably greater than 40:60. Examples of suitable isocyanate-reactive polyoxypropylene polyahls are PPG 2000 and PPG 2025 diols available from Arco Chemical. Preferably, the polyoxyethylene-polyoxypropylene polyahl comprises a polyol having a nominal hydroxyl functionality of 2, such as Niax 2025 available from Union Carbide Chemicals.

The polyisocyanate compositions may be prepared by any appropriate means which will be evident to one skilled in the art from the present disclosure. For example, it may be prepared by combining the diisocyanate and polyahl at elevated temperatures, e.g., 40°—100° C. and, if desired, in the presence of a urethane-formation catalyst, such as a tertiary amine or a tin compound. The relative amounts are chosen so as to arrive at a free NCO content of about 2 to 31% by weight. Preferably, the components are combined in such a manner so as to arrive at a free NCO content of 26.5 to 31% by weight and most preferably 26.5 to 28% by weight.

More preferably, the isocyanate-terminated prepolymer is prepared by adding the polyahl component to a molar excess of the diisocyanate component in a suitable reaction vessel over a period of about 15 minutes to 5 hours with agitation. The reaction vessel is maintained at a temperature of about 40° to about 135° C. during the period of addition. The reaction is generally conducted under an inert atmosphere. The reaction system is agitated and heated for a suitable period of time, generally ranging from about 30 minutes to 12 hours, the temperature of the system being maintained at about 60° to about 135° C. The polymethylene-polyphenylene polyisocyanate component of the prepolymer is blended with this system. This procedure may be conducted in one step or multiple steps. Specific methods for preparing isocyanate-terminated prepolymers from amino functional polyether resins are disclosed in U.S. Pat. Nos. 4,933,416; 3,441,588; 3,824,266; and 4,816,600 and from imino-functional and/or enamine containing resins as set forth in U.S. Pat. No. 4,906,674 may be used in the present invention and are incorporated herein by reference. The preparation of isocyanate-terminated prepolymers containing allophanate resins as disclosed in U.S. Pat. No. 4,866,103 may also be used and is incorporated herein by reference.

The polyisocyanate compositions preferably comprise 90 to 50% by weight of the above reaction product with 10 to 50%, preferably about 15 to about 40% by weight of a polymethylene-polyphenylene polyisocyanate having an average functionality of 2.1 and a free NCO content of 27 to 33% and preferably 29 to 32% by weight. The polymethylene-polyphenylene polyisocyanate contains about 45 to about 60% by weight and preferably from about 48 to about 58% of by weight of a tri- and higher functionality polyisocyanate species.

The present invention is further directed to reaction systems useful for the preparation of flexible polyurethane foams which comprise the polyisocyanate composition defined above and a polymer composition having at least two isocyanate-reactive groups and a number average equivalent weight of 700–3000. The present reaction systems can be used to produce flexible polyurethane foams having significantly lower compression sets relative to conventional MDI-based flexible foam systems and good tear strengths. However, the foams prepared with the present reaction systems have a significantly lower density in comparison to foams prepared from conventional MDI-based systems. In fact, the present reaction systems obtain flexible foams which are comparable to TDI-based foams in these properties.

The present reaction systems comprise the polyisocyanate compositions discussed above in an amount of about 37 to about 50, and preferably about 39 to about 42% by weight.

The reaction systems of the present invention further comprise about 50 to about 63 and preferably about 58 to about 61% of a polymeric polyol composition. Useful polymeric polyols are those having at least two isocyanate-reactive groups and include those generally known in the art, such as polyols and polyamines. The polymeric polyol composition preferably comprises about 50 to about 100% and preferably about 75 to about 90% of a polyoxyethylene-terminated polyoxypropylene polyol. This polymeric polyol should have a nominal hydroxyl functionality of about 2 to 6, preferably 2 to 3 and a total oxyethylene content of about 10 to 21%, preferably about 12 to 20%. Useful polymeric polyols have a hydroxyl equivalent weight of about 700–3000, preferably about 1,500 to 2,500, and more preferably about 1,700 to 2,000. When used, the polyoxyethylene-terminated polyoxypropylated polyol preferably also contains less than about 2% of internal oxyethylene units and should comprise at least 90% by weight of oxypropylene and oxyethylene units.

Polyether polyols which may be used include products obtained by the polymerization of a cyclic oxide, for example ethylene oxide, propylene oxide, butylene oxide or tetrahydrofuran in the presence, where necessary, of polyfunctional initiators. Suitable initiator compounds contain a plurality of active hydrogen atoms and include water and polyols, for example ethylene glycol, propylene glycol, diethylene glycol, cyclohexane dimethanol, resorcinol, bisphenol A, glycerol, trimethylolpropane, 1,2,6-hexanetriol or pentaerythritol. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Mixtures of the said diols and triols can be particularly useful. Other particularly useful polyether polyols include polytetramethylene glycols obtained by the polymerization of tetrahydrofuran.

Polyester polyols which may be used include hydroxyl-terminated reaction products of polyhydric alcohols such ethylene glycol, propylene glycol, diethylene glycol, 1,4-butanediol, neopentyl glycol, 1,6-hexanediol, cyclohexane dimethanol, bis(hydroxyethyl)terephthalate, glycerol, trimethylolpropane, pentaerythritol or polyether polyols or mixtures of such polyhydric alcohols and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride, dimethyl terephthalate or mixtures thereof. Polyesteramides may be obtained by the inclusion of amino alcohols such as ethanolamine in polyesterification mixtures. Polyesters obtained by the polymerization of lactones, for example carprolactone, in conjunction with a polyol, or of hydroxy carboxylic acids such as hydroxy caproic acid, may also be used.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerizing cyclic acetals.

Suitable polyolefin polyols include hydroxy-terminated butadiene homo- and copolymers and suitable polysiloxane polyols include polydimethylsiloxane diols and triols.

Other polyols which may be used comprise dispersions or solutions of addition or condensation polymers in polyols of the types described above. Such modified polyols, often referred to as "polymer" polyols have been fully described in the prior art and include products obtained by the in situ polymerization of one or more vinyl monomers, for example styrene and acrylonitrile, in polymeric polyols, for example polyether polyols, or by the in situ reaction between a polyisocyanate and an amino- or hydroxy-functional compound, such as a triethanolamine, in a polymeric polyol.

Polymer modified polyols which are especially useful are products obtained by the in situ polymerization of styrene and/or acrylonitrile in poly(oxyethylene/oxypropylene) polyols having functionalities of 2–4, equivalent weights of 700–3000 and ethylene oxide contents of 5–50%, preferably 5–30% on a weight basis of total oxyalkylene residues, and products obtained by the in situ reaction between a polyisocyanate and an amino or hydroxy-functional compound (such as triethanolamine) in a poly(oxyethylene/oxypropylene) polyol having a functionality of 2–4, an equivalent weight of 750–3000 and an ethylene oxide content of 5–50%, preferably 5–30% on a weight basis of total oxyalkylene residues.

Polyoxyalkylene polyols containing from 5 to 50% of dispersed polymer are particularly useful. Particle sizes of the dispersed polymer of less than 50 microns are preferred.

Other useful isocyanate-reactive polymers include polymeric polyamines, especially diamines and triamines, corresponding to the above-described polymeric polyols. Suitable polyamines of polyether polyols are those described, for example, in U.S. Pat. No. 3,654,374 or are obtained by the cyanoethylation of polyols followed by hydrogenation. Polyoxypropylene diamines and triamines and mixtures thereof are preferred. Also useful are polymers containing both amino and hydroxyl groups obtained by the partial amination of polyols.

Further isocyanate-reactive polymers include imino-functional polymers. Such polymers have been described in U.S. Pat. No. 4,794,129 together with methods for their preparation and include polymers terminating in imine, oxazoline, imidazoline, N-alkyl imidazoline, oxazine, diazine, iminoester, amidine, imidine, isourea and guanidine groups. The preferred imino-functional polymers are imino-containing polyethers such as may be obtained, for example by reacting a polyether polyamine, especially a polyoxypropylene diamine or triamine, with an aldehyde or ketone.

Enamine functional polymers may be prepared either from secondary amine terminated resins (i.e. polyethers) by reaction with ketones/aldehydes having one or more alpha hydrogens, or by reacting ketone/aldehyde terminated resins (bearing alpha hydrogens) with secondary amines, providing for removal of the H$_2$O formed in the reactions. Secondary amine terminated resins can be obtained, for example, by catalytic hydrogenation of the imino-functional polymers described hereinabove. Ketone/aldehyde terminated resins may be obtained, in general, by oxidation of the corresponding secondary or primary hydroxyl terminated resin. More highly enamine functional polymers can be prepared by oxidizing a primary hydroxy functional resin to the corresponding polycarboxylic acid, conversation of the groups to other esters and treatment of the latter with an excess of a secondary amine. Each orthoester must contain at least one alpha hydrogen atom.

The polyol compositions may further comprise up to 50% of a polymer-modified polyoxyethylene-terminated polyoxypropylene based polyol. Preferably, the polyol composition contains about 10 to about 20% by weight of this component. The base polyol precursor of the polymer-modified polyoxyethylene-terminated polyoxypropylene based polyol has a nominal hydroxyl functionality of from about 2 to 4, preferably about 3 and an equivalent weight of about 800 to 3,000, preferably about 1,500 to 2,100. The base polyol precursor of the polymer-modified polyol should have a total content of oxyethylene units of about 10 to 20% and preferably 15 to 17%. Generally, the polymer-modified polyol should contain less than about 2% internal oxyethylene units and is composed of about 90% by weight of oxypropylene and oxyethylene units.

It is preferred that the polyol composition comprise at least 50% of a polyoxyethylene-terminated polyoxypropylene based polyol having a nominal hydroxyl functionality of 2; and 0–50% of a polyoxyethylene-terminated polyoxypropylene-based polyol having a nominal hydroxyl functionality of 3. This composition may also comprise up to 50% of a polymer-modified polyoxyethylene-terminated polyoxypropylene based polyol having a nominal hydroxyl functionality of 2–4. These polyols should have a hydroxyl equivalent weight of about 1040 to 2500 and a total oxyethylene content of 10–21%. The polyols should also comprise greater than 90% by weight oxyethylene and oxypropylene units.

The present reaction systems are used to prepare polyurethane foams by reacting the components in the presence of a physical blowing agent such as commonly known compounds having a low boiling point (e.g., chlorofluorocarbons and hydrochlorofluorocarbons). The reaction systems of the present invention further preferably comprise water as a blowing agent, either alone or in combination with these physical blowing agents. The reaction systems contain water in a total concentration of about 0.25 to about 20, preferably about 4 to about 6 and more preferably about 4.4 to about 5.1% by weight, relative to the total weight of the polyol composition.

The reaction system is formulated in such a manner so that it has a final isocyanate index of from about 10 to about 120, preferably about 40 to about 105, more preferably about 75 to about 100 and most preferably about 80 to 90.

The present reaction systems may be prepared by conventional methods which will be evident to one skilled in the art from the present disclosure. The "B side" of the formulation, containing the polyol composition, water and adjuvants, if any, is simply prepared by blending the ingredients mechanically. The A and B sides may be then mixed together to form the reaction system of the present invention.

The present reaction system may further comprise a polyahl having a molecular weight of about 500 or less and preferably about 30 to about 400, containing about 2 to 4, preferably two isocyanate-reactive functional groups. When used, this component is contained in the reaction system in an amount of about 0 to 3% and preferably about 0.5 to about 2% by weight relative to the total amount of the polyol composition.

Examples of such polyahl components are those selected from the group consisting of aromatic diamines and/or triamines (wherein at least 90 mole percent of the amine groups are primary and/or secondary amines and wherein at least 90 mole percent of the primary or secondary amine groups are bonded directly to aromatic rings), alkanolamines, primary aliphatic diols and/or triols having 2 to about 4 carbon atoms and mixtures thereof. Preferred polyahls are those selected from the group consisting of primary or secondary aromatic diamines, diethanolomine and 1,4-butanediol. Particularly preferred polyahls are the bis-secondary diamines, such as Unilink 4200 from U.O.P. Corp.

When used to prepare foams, the reaction system of the present invention may further comprise various auxiliary agents and/or additives as necessary for a particular application. Generally, the additives will be premixed with the polymer component. For example, the reaction system may contain additives selected from the group consisting of catalysts, foam stabilizers, surfactants, chain extenders, cross linking agents, agents for suppressing the so-called boiling foam effect, fillers, fire retardants, nucleating agents, internal mold release agents, pigments, anti-oxidants, smoke suppressants, blowing agents, anti-microbial agents, anti-fungal agents, fragrances, plasticizers, anti-static agents and mixtures thereof.

Examples of suitable catalysts include tertiary amines, such as alkanolamines, and metallic salts, such as carboxylic acid metal salts and tin compounds. Examples of tertiary amine catalysts suitable for use in the present reaction systems include N,N-dimethylethanolamine and 1,4 diazobicylco[2,2,2]octane. The catalysts are used in concentrations of from about 0.01 to 10 and preferably about 0.05 to 5% by weight of the isocyanate-reactive component.

Other conventional additives which may be used in the present reaction systems include surfactants, such as siloxane-oxyalkylene copolymers; fire retardants, such as trichloropropyl phosphate and melamine; anti-oxidants, such as 3,5-di-t-butyl-4-hydroxy toluene and higher molecular weight hindered phenols; pigments, such as calcium carbonate and titanium dioxide; blowing agents, such as air, nitrogen and carbon dioxide; nucleating agents, such as carbon black and silica; smoke suppressants, such as antimony trioxide; anti-microbial and anti-fungal agents, such as tributyl tin oxide; antistatic agents, such as "Lubrol" available from ICI Americas Inc.; plasticizers, such as dioctylphthalate; internal mold release agents, such as zinc stearate; mold parting and internal lubricating agents, such as tallow diamine; chain extenders, such as low molecular weight diols or diamines, e.g., ethylene glycol, propylene glycol, diethylene glycol, dipropylene glycol, ethylene diamine and diethyl toluene diamine; and cross linking agents, such as triethanolamine; agents for suppressing the so-called boiling foam effect, such as poly-dimethylsiloxanes; and fragrances, such as "MASK 34004-O/S" sold by Stanley S. Schoemann, Inc., of Clark, N.J. Such additives may generally be used in amounts of less than about 1.0% by weight, with the exception of fire retardants which may be used in amounts of up to 15 parts per 100 parts of the polyol composition.

Specific auxiliary agents and/or additives useful in the present reaction system and their amounts as necessary for a particular application will be evident to one skilled in the art from the present disclosure.

In its preferred embodiment, the present reaction system should be substantially or completely free of chlorofluorocarbon blowing agents. By "substantially free", it is meant that the reaction system contains such blowing agents in an amount of less than about 0.2, preferably less than 0.10%.

The present reaction systems are formulated in such a manner so as to obtain flexible foams which are highly stable, have good strength properties, low compression sets and have a relatively low density. In its preferred embodiment and to achieve these objectives, the polymethylene-polyphenylene polyisocyanate content, the percentage of 2,4' MDI in the organic diisocyanate, the ethylene oxide content of the polyol composition and the amount of water in the reaction system may be varied relative to each other in order to provide the desired foam. Although, not wishing to be bound to a specific theory, it is believed that these variables are interdependent. For example, as the level of ethylene oxide in the polyol composition is reduced and the water content is increased, the levels of polymethylene-polyphenylene polyisocyanate and/or the 2,4'-MDI content in the organic diisocyanate must be increased to obtain stable, low density foam. For any given level of ethylene oxide in the polyol composition and water in the B side of the system, there is believed to be an interdependent level of 2,4' MDI and polymethylene-polyphenylene polyisocyanate in the A side, all amounts being within the ranges presently disclosed and claimed. Suitable variations of these components necessary to obtain desired foams will be evident to one skilled in the art from the present disclosure.

The flexible polyurethane foams produced with the present reaction system have a reduced density, a low compression set and a high tear strength relative to conventional MDI-based foams. The combination of properties is unexpected and an advantage over prior art systems. The produced foams may be slab stock or molded flexible foams. In general, the reaction systems can be used to produce flexible polyurethane foams having a molded core density of about 25 to about 80 kg/m$^3$, preferably about 30 to about 45 kg/m$^3$, more preferably less than about 34 kg/m$^3$; dry compression sets of about 5 to about 25% and preferably less than about 20% when measured at 50 or 75% compression; and humid aged compression sets of 10 to about 30% and preferably less than about 28% when measured at 50 or 75% compression at a temperature of 105° C. for three hours at 100% relative humidity.

The present reaction systems may be used in conventional processes to produce flexible polyurethane foams. Thus, the method for production of flexible polyurethane foams utilizing the present reaction systems is not limited. For example, the foams may be prepared in standard high pressure machines, including multi-component machines, at a mold temperature of about 120° to 140° F. and component pressures of about 2000 to 2500 psi and a throughput of about 275 to 375 g/sec. However, the foams may be prepared in low-pressure machines or by hand mixing. It is preferred that the foams be prepared by first combining the polyol composition, water and any polyahl components, as well as any auxiliary agents and/or additives, into a single blend. This blend is then reacted with the isocyanate-terminated prepolymer under conventional foam forming conditions to produce a foam.

For example, the reaction system is processed in high pressure molding machines such as the Krauss Maffei RIM-Star 40 or the Cannon H-40. Preferably, the system is processed at a chemical temperature of about 75° to 110° F.; a mold temperature of about 120° to 140° F.; a pressure of about 2000 psi and a throughput of 275 to 375 g/sec.

The present invention will now be illustrated by reference to the following specific non-limiting examples.

EXAMPLES

Example I

A prepolymer is prepared by reacting 82.1 parts by weight (pbw) of an isomeric mixture of diphenylmethane diisocyanate containing of 30% 2,4'-isomer with 17.9 pbw of an oxyethylated/oxypropylated trimethylol propane-initiated polyol having an oxyethylene content of about 75% randomly distributed and a molecular weight of 4000. The reaction is carried out at 80°–90° C. for 2.5 hours and the obtained prepolymer had an NCO-content of 27.0% by weight. 75 pbw of the above prepolymer were blended with 25 pbw of polymeric MDI (having an isocyanate content of 30.7% by weight). This polyisocyanate composition was used in preparing a flexible foam.

The above polyisocyanate composition according to the present invention was used to make a flexible foam in a foam-cup by reacting the polyisocyanate composition at an index of 78 with a polyol composition which was prepared by mixing 100 parts by weight (pbw) of a glycerol initiated oxyethylene oxypropylene polyol containing 17% by weight oxyethylene groups (all tip) and having a molecular weight of 4800, 4 pbw of water, 0.1 pbw of Niax A1 (amine catalyst from Union Carbide), 0.6 pbw of Dabco 33 LV (amine catalyst from Air Products) and 1.0 pbw of Tegostab® B 4113 (a surfactant from Goldschmidt).

The foam obtained had the following properties: overall density ($kg/m^3$): 53.3; core density ($kg/m^3$): 52.2; resilience (%): 53; tensile strength (kPa): 121; elongation at break (%): 102; tear strength (N/m): 253; compression hardness (at 25, 40 and 65%, kPa): 5.0, 6.5 and 15.3, respectively; hysteresis: 27; indentation hardness (at 25, 40 and 65% N): 200, 291 and 575, respectively; compression set (deflection at 50% and 75% dry and at 50% and 75% humid): 13.9, 11.2, 16.1 and 10.4, respectively.

Example II

In the following examples, the "A" side of the composition contains the isocyanate-terminated prepolymer. The "B" side contains all other components of the reaction system, specifically the polyol composition, water, polyahl component and auxiliary agents and additives, if used.

In the following Examples, the "A side" was prepared by reacting 82.1 parts by weight of an isomeric mixture of diphenylmethane diisocyanate containing 30% 2,4'-isomer with 17.9 parts by weight of an oxyethylated/oxypropylated trimethylol propane-initiated polyol having an oxyethylene content of about 75% randomly distributed and a molecular weight of 4,000. The reaction was conducted at 80°–90° C. for 2.5 hours and the obtained intermediate prepolymer had an NCO content of 27.0% by weight. 63.75 parts by weight of this intermediate prepolymer were then mixed with 36.25 parts by weight of polymeric MDI having an NCO content of 31.5% by weight and comprising 58% by weight of polyisocyanate having an NCO-functionality of three or more. The "B sides" of the reaction systems are set forth in Table 1. The B sides of each system were prepared by adding the polyols, catalysts and water to a separate mix tank. This mixture was stirred for ½ hour at room temperature with a motorized mix blade.

Flexible foams were prepared by separately pumping the "A side" and "B side" at 2000 psi through a mix head of a Cannon H-40 molding machine (for sample 1) and a Krauss Maffei RIM-Star 40 molding machine (for sample 2). The temperature of the A and B sides was maintained at 75° to 110° F. and the mold was maintained at a pressure of 120°–140° F. The pressure within the molding machine was maintained at 2000 psi.

TABLE 1

|  | 1 | 2 |
| --- | --- | --- |
| Polyol 1 | 100 | 50 |
| Polyol 2 | — | 50 |
| Niax A-1 | 0.06 | 0.05 |
| Dabco 33LV | 0.44 | 0.45 |
| Dabco 8154 | 0.30 | 0.65 |
| Unilink 4200 | 0.50 | 0.50 |
| Tegostab B 4113 | 0.50 | 0.50 |
| DC 5169 | — | 0.30 |
| Water | 5.1 | 5.1 |

Polyol 1 is an EO/PO polyether diol (16.1% EO-tip and an equivalent weight of 1870.)

Polyol 2 is an EO/PO polyether triol (16% EO-tip and an equivalent weight of 2000).

Niax A-1 is an amine catalyst available from Union Carbide.

Dabco 33LV is an amine catalyst available from Air Products.

Dabco 8154 is an amine catalyst available from Air Products.

Unilink 4200 is an amine stabilizer available from U.O.P. Corp.

Tegostab B 4113 is a silicone surfactant available from Th. Goldschmidt; and

DC 5169 is a silicone surfactant available from Air Products.

The "minimum fill weight" is the minimum amount of material necessary to fill a 15"×15"×5" mold. Each sample was measured for block weight and core density. Each sample was tested for 65% ILD; Tear Strength; 50% and 75% Compression Set and 50% and 75% Humid Aged Compression Set, Tensile Strength and Elongation all according to ASTM D3574. The results of these measurements and tests are set forth in Table 2 on the following page.

TABLE 2

|  | 1 | 2 |
| --- | --- | --- |
| Minimum Fill Weight (g) | 615 | 644 |
| Core Density $kg/m^3$ | 29.8 | 33.5 |
| 65% ILD (N) | 242 | 262 |
| Tear Strength | 172 | 164 |
| 75% C.S. (% d) | 15.6 | 16.6 |
| 75% HACS (% d) | 20.1 | 11.4 |
| 50% CS (% d) | 17.1 | 14.0 |
| 50% HACS (% d) | 23.0 | 11.6 |
| Tensile Str. (KPa) | 96 | 103 |
| Elongation (%) | 124 | 123 |

As can be seen from the data set forth above, the flexible polyurethane foams prepared with the reaction systems of the present invention have a relatively low core density while maintaining a high tear strength and low compression set.

Example III

The following composition was prepared in accordance with the present invention.

The A side of the reaction system was prepared in the manner set forth in Example II above, with the exception that 71.25 parts by weight of the intermediate prepolymer were mixed with 28.75 parts by weight of the polymeric MDI.

The B side of the reaction system contained the components set forth on the following page and prepared in the manner disclosed in Example II.

| | |
|---|---|
| Polyol 3 | 43.8 |
| Polyol 4 | 12.4 |
| Polyol 5 | 43.8 |
| Niax A-1 | 0.076 |
| Dabco DMEA | 0.19 |
| Dabco 33LV | 0.17 |
| Dabco 8154 | 0.57 |
| Unilink 4200 | 0.48 |
| Tegostab B 4113 | 0.50 |
| Water | 4.55 |

Polyol 3 is a polyether diol (having 21% EO-tip and an equivalent weight of 1870).

Polyol 4 is a polyether triol (having a 15% EO-tip).

Polyol 5 is a polyether triol (having a 17% EO tip and an equivalent weight of 1600).

Dabco DMEA is an amine catalyst available from Air Products.

The present invention may be embodied in other specific forms without departing from the spirit attributes thereof and, accordingly, reference should be made to the appended claims rather than to the foregoing specification, as indicating the scope of the invention.

What is claimed is:

1. A polyisocyanate composition comprising the reaction product of a diphenylmethane diisocyanate composition comprising 25 to 70% by weight of 2,4'-diphenylmethane diisocyanate and an isocyanate-reactive polyoxyethylene polyoxypropylene polyahl having an ethylene oxide content of at least 30% by weight, a number average hydroxyl equivalent weight of 700 to 2000 and an average nominal hydroxyl functionality of 2 to 6, the reaction product having a free NCO content of 26.5 to 31% by weight.

2. A polyisocyanate compositions as in claim 1, wherein said polyahl is a polyoxyethylene polyoxypropylene polyol having an ethylene oxide content of 50 to 90% by weight.

3. A polyisocyanate composition as in claim 1, wherein said diphenylmethane diisocyanate comprises 25 to 35% by weight of 2,4'-diphenylmethane diisocyanate, and said isocyanate-reactive polyoxyethylene-polyoxypropylene polyahl has an ethylene oxide content is 60 to 90% by weight, and an average hydroxyl equivalent weight of 1000 to 1800, wherein the reaction product has a free NCO content of between 26.5 to 31.0% by weight.

4. A polyisocyanate composition as in claim 2, wherein the polyol contains the oxyethylene moieties randomly distributed.

5. A polyisocyanate composition comprising (a) 90 to 50% by weight of the reaction product of a diphenylmethane diisocyanate comprising 25 to 70% by weight of 2,4'-diphenylmethane diisocyanate and an isocyanate-reactive polyoxyethylene-polyoxypropylene polyahl having an ethylene oxide content of at least 30% by weight, a number average hydroxyl equivalent weight of 700 to 2000 and an average nominal hydroxyl functionality of 2 to 6, the reaction product having a free NCO content of 26.5 by weight; and (b) 10 to 50% by weight of a polymethylene-polyphenylene polyisocyanate having a functionality of at least 2.1 and a free NCO content of 27 to 33% by weight.

6. A reaction system comprising:

(a) 37 to 50% by weight of a polyisocyanate composition according to claim 1; and (b) 50 to 63% by weight of a polymer having at least two isocyanate-reactive groups and a number average equivalent weight of 700–3000.

7. A reaction system for the preparation of flexible polyurethane foams comprising:

(1) 37 to 50% by weight of an isocyanate-terminated prepolymer comprising:

(a) greater than 25 to 45% of a polymethylene-polyphenylene polyisocyanate;

(b) 48 to 62% of an organic diisocyanate composition comprising 25 to 70% by weight of 2,4'-diphenylmethane diisocyanate;

(c) 6 to 13% of an isocyanate-reactive polyoxyethylene-polyoxypropylene polyahl containing 2 to 4 isocyanate-reactive groups, said polyahl having an equivalent weight of 1000 to 2000, an ethylene oxide content of greater than 30% on a weight basis of total oxyethylene residues and comprising at least 85% by weight of a copolyether of ethylene oxide and propylene oxide;

(2) 50 to 63% by weight of a polymeric polyol composition comprising 50 to 100% of a polyoxyethylene-terminated polyoxypropylene polyol having a total oxyethylene content of 10 to 21% and a nominal hydroxyl functionality of 2 to 4; and (3) water in an amount of greater than 4 to about 6% by weight based upon the total weight of the polyol composition.

8. A reaction system as in claim 7, further comprising a polyahl having a molecular weight of 500 or less and containing from 2 to 4 isocyanate-reactive groups, said polyahl being selected from the group consisting of aromatic diamines, aromatic triamines, alkanolamines, primary aliphatic diols, primary aliphatic triols and mixtures thereof.

9. A reaction system as in claim 8, wherein said polyahl is selected from the group consisting of aromatic diamines and aromatic triamines, wherein at least 90 mole % of said amine groups are primary or secondary amines and at least 90 mole % of said primary or secondary amine groups are bonded directly to aromatic rings.

10. A reaction system as in claim 8 comprising said polyahl in an amount of 0 to 3% weight, based upon the total amount of the polyol composition.

11. A reaction system as in claim 7, further comprising an adjuvant selected from the group consisting of catalysts, foam stabilizers, surfactants, fillers, fire retardants, nucleating agents, internal mold release agents, pigments, antioxidants, smoke suppressants, blowing agents, antimicrobial agents, antifungal agents, fragrances, plasticizers, anti-static agents and mixtures thereof.

12. A reaction system as in claim 7, wherein said isocyanate-terminated prepolymer further comprises 0–15% of an isocyanate-reactive polyoxypropylene polyahl containing 2 to 4 isocyanate-reactive groups, said polyahl having an equivalent weight per isocyanate reactive functional group of between 800 to 2,000 and comprising at least 90% by weight oxypropylene units.

13. A reaction system as in claim 12, wherein said isocyanate-terminated prepolymer is prepared by combining said isocyanate-reactive polyoxyethylene-polyoxypropylene polyahl and said isocyanate-reactive polyoxypropylene polyahl with an excess of monomeric di- and polyisocyanate species.

14. A reaction system as in claim 12 wherein said isocyanate-reactive polyoxypropylene polyahl comprises a polyol having a nominal hydroxyl functionality of 2.

15. A reaction system as in claim 7, wherein said organic diisocyanate is selected from the group consisting of 2,4-toluene diisocyanate, 2,6-toluene diisocyanate, 4,4'-diphenylmethane diisocyanate, 2,4'-diphenylmethane diisocyanate, 2,2'-diphenylmethane diisocyanate and mixtures thereof.

16. A reaction system as in claim 7, wherein said organic diisocyanate composition comprises 2 to 70% by weight of 2,4'-diphenylmethane diisocyanate.

17. A reaction system as in claim 7, wherein said isocyanate-reactive polyoxyethylene-polyoxypropylene polyahl has a molar ratio of oxyethylene to oxypropylene units of 1:1 to 90:10.

18. A reaction system as in claim 17, wherein said isocyanate-reactive polyoxyethylene-polyoxypropylene polyahl has a molar ratio of oxyethylene to oxypropylene units of greater than 40:60.

19. A reaction system as in claim 7, wherein said polyoxyethylene-terminated polyoxypropylene polyol has a hydroxyl equivalent weight of 1000 to 2000.

20. A reaction system as in claim 7, wherein said polyol composition further comprises 0 to 50% of a polymer-modified polyoxyethylene-terminated polyoxypropylene polyol having a nominal hydroxyl functionality of 2 to 4.

21. A reaction system as in claim 7, wherein said polyol composition comprises a polyoxyethylene-terminated polyoxypropylene polyol comprising at least 90% by weight of oxypropylene and oxyethylene units.

22. A reaction system as in claim 7, wherein said isocyanate-terminated prepolymer contains about 52 to 59% by weight of said organic diisocyanate composition.

23. A reaction system as in claim 7, having an isocyanate index in the range of from 75 to 100.

24. A reaction system as in claim 7, wherein said isocyanate-terminated prepolymer comprises 28 to 37% of said polymethylene-polyphenylene polyisocyanate.

25. A reaction system as in claim 24 wherein said polymethylene-polyphenylene polyisocyanate comprises 45 to 60% of tri- and higher functionality polyisocyanates.

26. A reaction system as in claim 7, wherein said polyoxyethylene-terminated polyoxypropylene polyol has an oxyethylene content of 12 to 20%.

27. A reaction system as in claim 7 comprising water in an amount of 4.4 to 5.1% by weight based on the total weight of the polyol composition.

28. A reaction system as in claim 7, wherein said isocyanate-reactive polyoxyethylene-polyoxypropylene polyahl has an ethylene oxide content of 68 to 75% on a weight basis of total oxyethylene residues.

29. A process for preparing flexible polyurethane foams comprising reacting components (a) and (b) according to claim 6 under foam forming conditions.

* * * * *

UNITED STATES PATENT AND TRADEMARK OFFICE
CERTIFICATE OF CORRECTION

PATENT NO. : 5,621,016
DATED : April 15, 1997
INVENTOR(S) : Murty, et. al.

It is certified that error appears in the above-identified patent and that said Letters Patent is hereby corrected as shown below:

Column 13, Line 56 after 26.5 insert

-- to 31% --.

Signed and Sealed this

Nineteenth Day of May, 1998

Attest:

BRUCE LEHMAN

Attesting Officer

Commissioner of Patents and Trademarks